United States Patent [19]
Beistle

[11] 3,796,393
[45] Mar. 12, 1974

[54] PNEUMATIC-PHOTOELECTRIC TRANSDUCER IN A MAGNETIC TAPE UNIT
[75] Inventor: Rex G. Beistle, Longmont, Colo.
[73] Assignee: International Business Machines Corporation, Armonk, N.Y.
[22] Filed: Apr. 19, 1972
[21] Appl. No.: 245,352

[52] U.S. Cl.............. 242/184, 226/45, 226/118, 242/185, 250/231 P
[51] Int. Cl.................. G11b 15/58, G01d 5/34
[58] Field of Search .......... 242/182, 183, 184, 185, 242/75.52; 226/118, 95, 97, 45; 250/219 L, 231 P, 231 R, 219 W

[56] References Cited
UNITED STATES PATENTS

| | | | |
|---|---|---|---|
| 2,921,753 | 1/1960 | Lahti et al. | 242/184 |
| 2,988,294 | 6/1961 | Neff | 242/75.52 X |
| 3,249,760 | 5/1966 | Miller | 250/231 P |
| 3,502,892 | 3/1970 | Brittain | 250/231 R |
| 3,596,513 | 8/1971 | Sandstedt | 250/231 P |
| 3,701,494 | 10/1972 | Proulx | 242/184 |

Primary Examiner—George F. Mautz
Attorney, Agent, or Firm—Francis A. Sirr

[57] ABSTRACT

A pneumatically actuated, binary output photoelectric transducer selectively communicates with atmospheric pressure or subatmospheric pressure, in accordance with the position of the tape loop in the pneumatic buffer of a magnetic tape unit. The transducer includes a flat, reflective, air-impervious, lightweight, movable member which responds to subatmospheric pressure and is forced into a flexed position thereby. A light beam reflects off the member onto a photocell only when the member is in this flexed position. The resulting active output of the photocell indicates that the position of the tape loop is such that the transducer is subjected to subatmospheric pressure.

9 Claims, 6 Drawing Figures

FIG. 3
FIG. 4
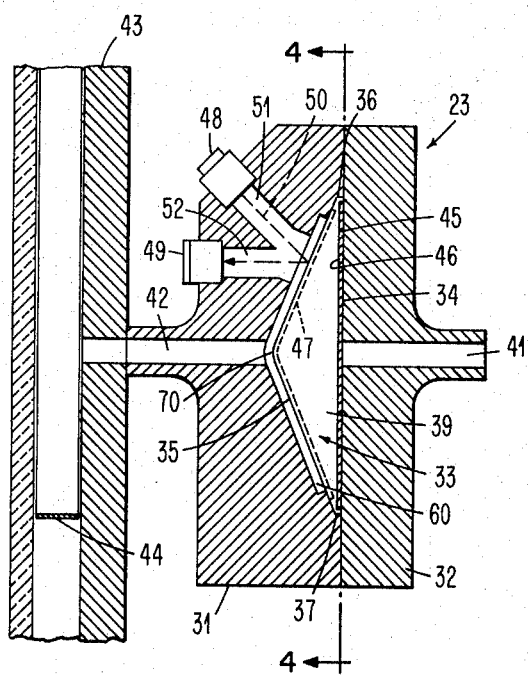
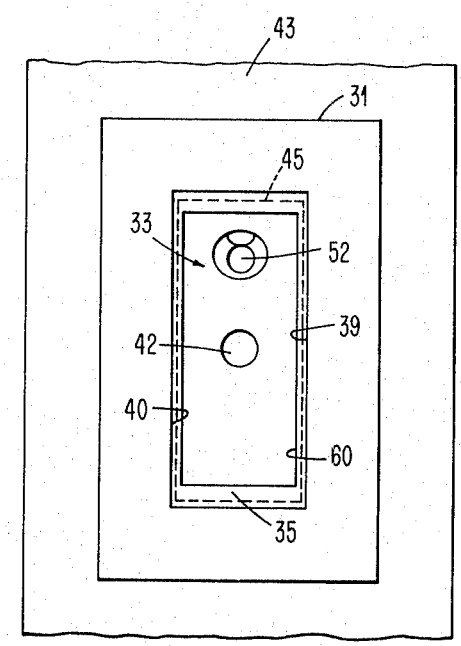
FIG. 5
FIG. 6
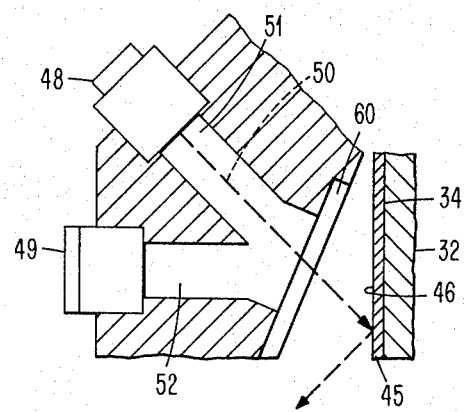
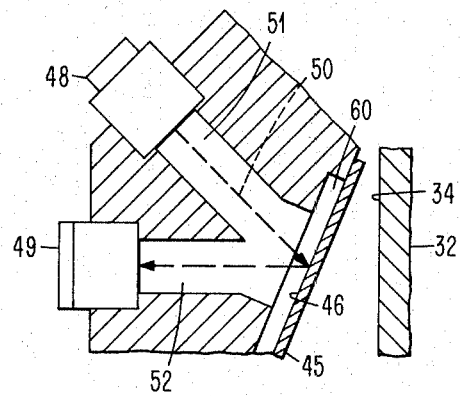

PNEUMATIC-PHOTOELECTRIC TRANSDUCER IN A MAGNETIC TAPE UNIT

BACKGROUND AND SUMMARY OF THE INVENTION

This invention pertains to the field of winding and reeling of a web-like material which carries machine-convertible information, wherein a web transport machine includes a low inertia vacuum chamber buffer, and wherein loop condition responsive control of an associated reel motor is achieved by a pneumatic condition sensing means, and specifically an electrical condition sensing means including a light source/photocell couple whose binary operation is controlled by a pneumatically responsive movable member.

Prior art magnetic tape units of the vacuum column buffer type provide photoelectric sensing of the column's tape loop position, for example, by positioning a number of light sources on one side of the column and a like number of photocells on the other side of the column. Another type photoelectric sensing closely spaces the photocells and light sources on adjacent walls, where these walls meet to form a square corner. In either event, as the tape loop moves in the column, the photoelectric couples formed by light sources and their photocells are modified by the loop of recording tape.

While these prior art devices are generally satisfactory, they are susceptible to malfunction in the event that brilliant light strikes the front of the tape unit. For example, a computer room is often open to public view through large exterior windows. Sunlight may, at a certain time of day, strike the tape unit's vacuum columns and falsely activate the photocells. Also, photographing portions of the computer room, and the attendant use of photoflash sources, may falsely activate the photocells. In either event, servo control of the associated reel motors by the column's photoelectric couples is no longer reliable.

To avoid these possible malfunctions, the front glass walls of the vacuum columns can be tinted or rendered opaque. This solves the problem of unwanted light sources, but makes visual inspection of the vacuum columns and observation of the dynamic servo control of the tape loop more difficult.

Other prior art provides pneumatically responsive transducers which cooperate with the vacuum column and respond to the presence of atmospheric pressure above the tape loop or subatmospheric pressure below the tape loop. These transducers are, for example, of the type having a mechanical binary switch, a continuously variable capacitance output, or a continuously variable strain gage output. These devices are also generally satisfactory. However, the devices having mechanical switches are relatively expensive, if reliability and long-life are to be achieved. The capacitor and strain gage devices are relatively expensive, and additionally the signal level obtained from these devices is relatively low, thus amplifying devices must be provided.

The present invention provides an improved transducer which is pneumatically responsive to the position of the tape loop in the vacuum column and provides a relatively high-level photocell output signal in accordance therewith.

Specifically, the transducer of the present invention includes a pneumatically responsive, lightweight "shutter" or light controlling member which is movable by virtue of the vacuum force below the tape loop, and which, when so moved, modifies a light source/photocell couple. The shutter is loosely positioned in a light impervious housing. This housing is connected to a wall of the vacuum column by a short conduit or length of tubing. The movable member is moved from a stable position to an unstable position by virtue of vacuum force at this portion of the vacuum column wall. With such a construction, the movable member responds quickly to a change in pressure at the column wall, and a relatively high signal output occurs at the photocell.

More specifically, the transducer of the present invention is of simple construction. A closed housing includes an internal cavity. A curved wall of this cavity is connected to the vacuum column wall by a first port or conduit. A second port or conduit connects an opposite flat wall of the cavity ot atmospheric or ambient pressure. A flexible, flat, air-impervious movable member is loosely placed within the cavity. The cavity and this member are dimensioned such that the member, while in its stable or preferred flat state, assumes a position at or closely adjacent the flat wall of the cavity. When this member is subjected to vacuum force, by way of the above-mentioned first port, the member assumes a flexed, unstable shape, conforming to the curved wall of the cavity. In this position, the member substantially closes the first port and prevents air flow into the vacuum column below the tape loop. The housing also includes a light source and a photocell mounted in noncommunicating relation at the curved wall of the cavity. Light from the light source is reflected off the member onto the photocell only when the member conforms to the curved wall of the cavity.

The foregoing and other features, and advantages of the invention will be apparent from the following more particular description of preferred embodiments of the invention, as illustrated in the accompanying drawing.

BRIEF DESCRIPTION OF THE DRAWING

FIG. 3 is a section view of one of the position sensors of FIG. 1, FIG. 4 is a view of the sensor's housing cavity, taken along the line 4—4 of FIG. 3, FIG. 5 is a phantom view of a portion of the sensor of FIG. 3, showing the movable member in its stable position, wherein the light path of the associated photoelectric couple is open, and FIG. 6 is a phantom view, like FIG. 5, showing the movable member in its unstable position, wherein the light path is closed.

DESCRIPTION OF THE PREFERRED EMBODIMENT

While the following description will deal with a magnetic tape unit having a pneumatic column buffer of the type wherein subatmospheric or vacuum pressure is induced at the closed end of the column, to thereby provide vacuum force to draw a length of recording tape into the column to form a loop, the present invention is not to be restricted thereto. For example, pneumatic buffers are known wherein a positive pressure, above atmospheric, is induced at the open end of the column. In this case, the positive pressure forces the web into the column to form a loop. In either case, the present transducer experiences a pneumatic-force change as the web loop position changes. In accordance with the present invention, this pneumatic-force change is applied to an air-impervious movable member, and movement of this member modifies a photoelectric couple.

Figure 1:
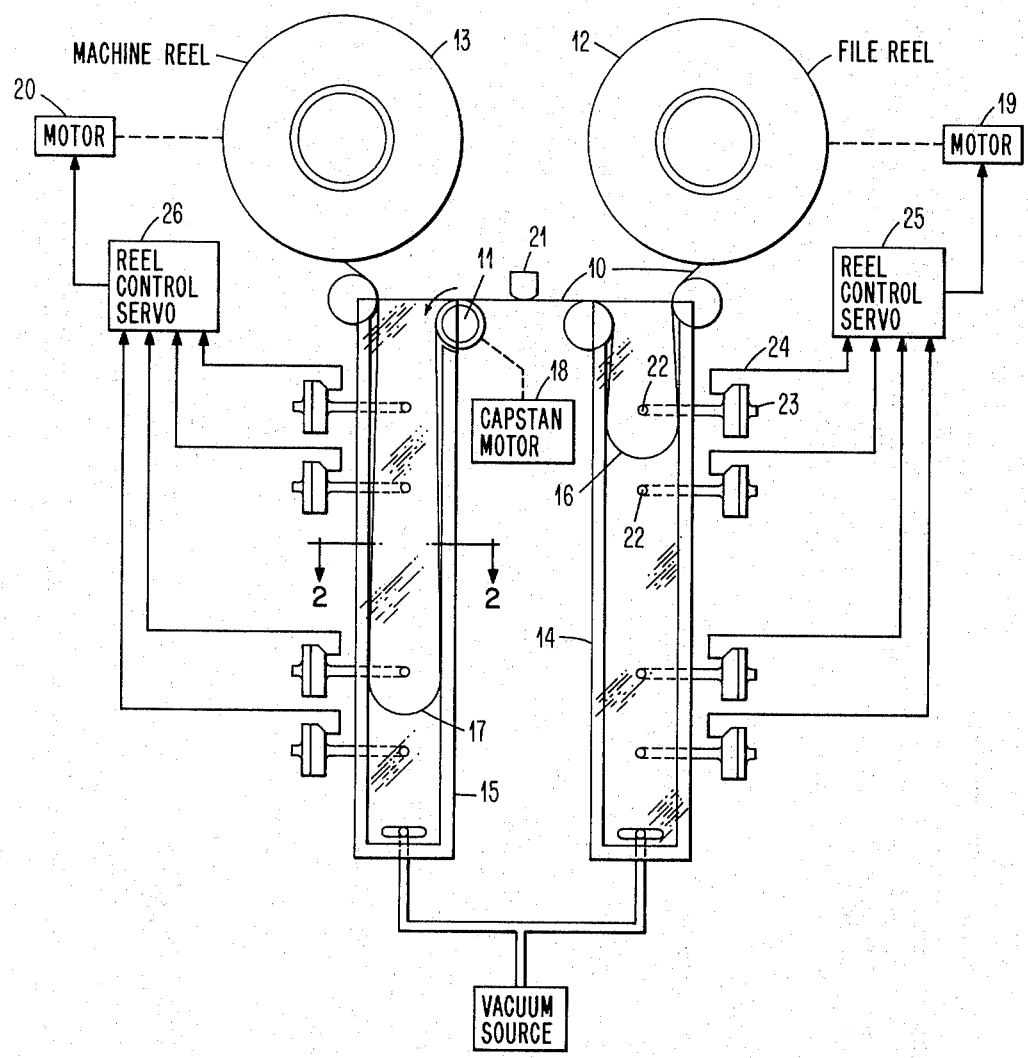
FIG. 1 is a diagrammatic showing of a magnetic tape unit embodying the present invention, the tape unit having two vacuum column pneumatic buffers, each column having four tape loop position sensors providing binary output which is used to servo control the associated reel motor.

Referring to FIG. 1, a typical web transport is disclosed wherein a moving web of magnetic recording tape 10 travels under the control of bidirectional capstan 11. Capstan 11 is directly connected to high torque — low inertia motor 18. The forward direction of tape travel is from supply or file reel 12 to machine or take-up reel 13. Immediately adjacent each of the reels is a pneumatic vacuum column buffer 14, 15. Tape 10, as it travels in the tape path between reels 12 and 13, forms two variable length loops of buffered tape 16 and 17 in the respective columns 14 and 15. Thus, high-torque low-inertia motor 18 and capstan 11 are isolated from the high inertia reels and their motors 19 and 20.

By way of example, capstan motor 18 may be of the type shown in U.S. Pat. No. 3,490,672, issued to Gene A. Fisher and Howard E. Van Winkle. The function of motor 18 and capstan 11 is to quickly accelerate the relatively short length of tape extending between vacuum columns 14 and 15, and thereafter accurately maintain the speed of this tape at a constant value as the tape travels through tape processing station 21. Motor 18 may be energized for varying time periods, depending upon the particular data processing programming commands received by the capstan motor. Normally, the tape moves no more than a few inches before motor 18 receives a command to decelerate the tape to a rest position. Vacuum columns 14 and 15 serve the purpose of allowing a relatively long time for motors 19 and 20 to come up to speed while tape loops 16 and 17 vary in length, one of the loops supplying tape to the capstan and the other loop receiving tape from the capstan. As shown in FIG. 1, if the capstan rotates in a counterclockwise direction, the reel motors are servo controlled to maintain a minimum length tape loop in column 14 and a maximum length tape loop in column 15.

Each of the columns includes four air flow means or ports 22. Each individual port 22 is connected to a pneumatic-photoelectric transducer 23. Each transducer 23 provides a binary output signal on its conductor 24 to its reel control servomechanism 25, 26 to control motor 19, 20 in accordance with the position of the loop in its respective column. By way of example, reel control servoes 25 and 26 may be of the type shown in U.S. Pat. No. 3,550,878, issued to James W. Crisp and Richard W. Van Pelt.

By way of example, and considering vacuum column 14, loop 16 is positioned within the column so as to subject the upper one of the four transducers 23 to atmospheric pressure, whereas the three lower transducers are subjected to vacuum or subatmospheric pressure. Thus, the electrical output of the upper transducer is at one binary state whereas the electrical output of the three lower transducers is at the other binary state.

Figure 2:
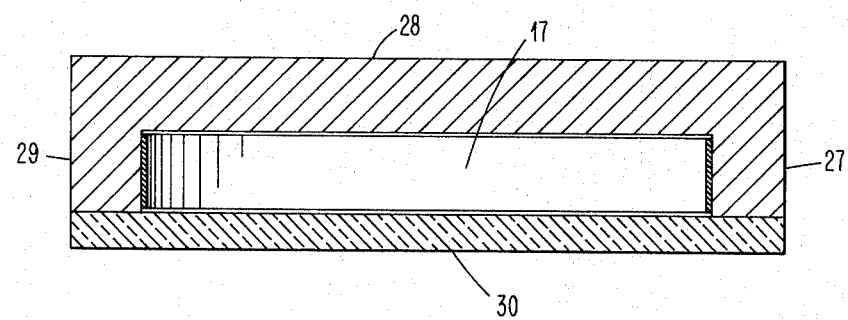
FIG. 2 is a cross section view of one of the vacuum columns of FIG. 1, showing the three opaque walls and the front transparent glass wall.

Each of the vacuum columns 14 and 15 is constructed as shown in FIG. 2. From this view it can be seen that loop 17 substantially seals the column, causing ambient or atmospheric pressure to exist above the loop and causing vacuum or subatmospheric pressure to exist below the loop. The three walls 27, 28 and 29 are opaque, preferably metal, walls whereas front wall 30 is transparent glass, allowing visual inspection and observation of the column.

FIG. 3 is a section view of one of the position sensors 23 of FIG. 1, showing the sensor connected to the back wall 43 of a column wall. Each of the sensors 23 includes an opaque housing formed by mating housing members 31 and 32. These two members are formed so as to form a closed cavity 33 within the housing. Cavity 33 includes a generally flat wall 23 and an oppositely disposed v-shaped or curved wall 35 having a large radius at apex 70. The two diverging walls which form curved wall 35 terminate at 36 and 37, respectively, and are closely spaced to flat wall 34 at these points of termination. Cavity 33 is completed by two parallel triangular shaped walls 39 and 40, best seen in FIG. 4.

Flat cavity wall 34 includes an air flow means or port 41 which connects that wall of the cavity to ambient atmospheric pressure. Housing portion 31 includes a second air flow means or port 42 which connects cavity wall 35 to the relatively wide back wall 43 of the vacuum column. While sensor 23 may be connected to the vacuum column by a longer conduit than shown in FIG. 3, a relatively short conduit is preferred due to the sonic delay of the longer conduit. As shown in FIG. 3, tape loop 44 is at a position below transducer 23. Thus, ports 41 and 42 are both connected to ambient atmospheric pressure; and movable member 45 is in its stable, flat position adjacent flat wall 34 where it substantially closes port 41.

Air-impervious, flat, flexible movable member 45 is loosely positioned within cavity 33. This member is shown in its stable position, this being the preferred position that the member at all times assumes when it is not subjected to a differential pneumatic force. Cavity 33 is formed so as to have smooth walls, thereby insuring that member 45 moves freely within the cavity.

The general flat shape of member 45 is shown in broken lines in FIG. 4. From this Figure it can be seen that the shape of member 45 conforms generally to the oblong, rectangular shape of cavity 33, such that while member 45 is loosely placed within the cavity, it will, in its stable position, substantially close port 41 formed in the flat wall 34 of the cavity. The surface 46 of member 45 carries a reflective surface. This surface is operable to close the above-mentioned light path when member 45 assumes its dotted line, unstable position 47, shown in FIG. 3. When tape loop 44 moves above port 42, that portion of cavity 33 adjacent curved wall 35 is subjected to subatmospheric pressure and air flows from port 41, through cavity 33 and port 42 to the column's vacuum source. This pneumatic pressure differential causes member 45 to flex and assume to its unstable dotted line position 47. In this position, member 45 substantially seals port 42 and prevents continuous leakage of air into the column's vacuum source.

The angular position relationship that exists between light source 48, the reflective surface of member 45 when it is in its stable and unstable positions, and photocell 49, insures that photoelectric couple 48, 49 is open when member 45 is in its stable position and is closed when member 45 is in its unstable position.

A feature of the present invention is the simplicity of the cooperative relation of member 45, cavity 33, and photoelectric couple 48, 49. Member 45 is not fixed or hinged to the housing. It is loosely placed in cavity 33 and its shape is such that it resides only adjacent flat wall 34 when not subjected to a pressure differential. Member 45 can tilt only slightly before engaging one of the two individual diverging walls of curved wall 35. As a result, no points of stress exist in member 45 and it does not deteriorate with use. Also, photoelectric couple 48, 49 is so positioned within member 31, and the length of member 45 is so selected, that member 45 always assumes an unstable position whereat the photoelectric couple is closed. As a result of this feature of the present invention, sensors 23 are not attitude sensitive, but may be mounted in any position.

By way of example, member 45 is formed as a flat, lightweight strip of Mylar polyester, approximately 0.006 inch thick, having reflective surface 46 formed of vapor deposited aluminum. Cavity 33 is 0.187 inch wide, as measured between triangular walls 39 and 40. The corresponding dimension of member 45 is 0.18 inch. The length of the cavity, measured along flat wall 34, is 0.8 inch. The corresponding dimension of member 45 is 0.75 inch. The height of the cavity, measured from flat wall 34 to apex 70, is 0.1 inch. Member 45 is selected to possess a modulus of elasticity and a thickness that ensure the member will return to its stable flat state after repeated flexing. Generally, the higher the modulus, the thinner the member should be for a given pressure differential operating point. Using this criteria, member 45 could also be formed of a thin strip of polished stainless steel. The large radius provided at apex 70 is selected to prevent member 45 from exceeding its elastic limit and thereby taking a "set" when in its curved unstable shape.

Above-mentioned photoelectric couple 48, 49 is formed by light source 48 and photocell 49. Source 48 is more broadly a source of electromagnetic radiation, for example, visible light, which is matched to photocell 49 and emits radiation to which the photocell is sensitive. Photocell 49 may take a variety of forms, such as photovaltoic, photoconductive, or photoemissive. Components 48 and 49 are mounted within housing portion 31 and communicate with cavity 33 by way of tubular bores 51 and 52, respectively. The housing and these bores are formed so that light from source 48 is not directly communicated to photocell 49. Light path 50 is completed between 48 and 49 only when member 45 is in unstable position 47. In this position, the light from source 48 is reflected by reflecting surface 46 onto photocell 49.

The phantom views of FIGS. 5 and 6 show member 45 in its stable and unstable position, respectively, and light path 50 in its open and closed condition, respectively.

A feature of the present invention provides a recessed surface 60 formed within curved wall 35 of the cavity to support member 45 in unstable position 47 without physically contacting that portion of the reflective surface 46 which is relied upon to complete photoelectric couple 48, 49. As can be seen in FIG. 4, recessed surface 60 is smaller in area than is member 45. Thus, member 45 is supported about its periphery when in its unstable position. However, when so supported, the area at which light path 50 strikes reflective surface 46 is free of physical engagement and thus its reflective properties will not deteriorate with use.

This recessed surface 60 does not extend the full length of curved wall 35, and in fact is substantially shorter than the curved wall so that whatever position member 45 takes adjacent the curved wall, the member always covers the entire recessed surface and thus effectively closes port 42.

While the invention has been particularly shown and described with reference to a preferred embodiment thereof, it will be understood by those skilled in the art that various changes in form and detail may be made therein without departing from the spirit and scope of the invention.

What is claimed is:

1. A pneumatically responsive photoelectric transducer for use with the pneumatic buffer of a web transport to provide an electrical output signal indicating the position of the web loop in the buffer, the transducer comprising:

a closed housing having a cavity including a generally flat wall and an oppositely disposed curved wall, a first air-flow port connecting the flat wall of said cavity to ambient pressure, a second air-flow port connecting the curved wall of said cavity to a wall of said buffer which selectively communicates with ambient pressure on one side of the web loop or a differential pressure on the opposite side of the web loop, in accordance with the position of the loop, a flat, air-impervious movable member in said cavity and movable from a preferred flat position adjacent said first port to an unstable curved position adjacent said second port when the position of the web loop establishes a pressure differential at said second port, said member when in said unstable position substantially sealing said second port to thereby restrict airflow through said housing, and a photoelectric couple controlled in accordance with the position of said member to provide an output signal indicating the position of the web loop.

2. A transducer as defined in claim 1 wherein at least a portion of said member includes a light-reflective surface, and means including said surface completing said photoelectric couple only when said member is in one of its two positions.

3. A transducer as defined in claim 1 wherein said differential pressure is established by a vacuum force which pulls said web into said buffer to form a loop therein and said member is forced into said unstable curved position adjacent said second port when said second port is subjected to the vacuum force below said loop.

4. A transducer as defined in claim 3 wherein said movable member includes a reflective surface, and wherein said reflective surface is operable to complete said photoelectric couple only when said member is in said curved position.

5. In a magnetic tape unit having at least one pneumatic column buffer which buffers a variable length loop of magnetic recording tape as the tape travels between a reel and a tape processing station, an improved transducer for sensing the length of the tape loop in the buffer and servo controlling the rotation of said reel, comprising:

a housing including a closed cavity having a generally flat wall and an oppositely disposed curved wall, first air-flow means continuously connecting said flat wall to ambient pressure, second air-flow means connecting said curved wall to a wall of said buffer which communicates with ambient pressure on one side of the tape loop and a differential pressure on the opposite side of the tape loop, in accordance with the length of the loop, a flat, flexible air-impervious movable member positioned in said cavity in a manner to be moved from a stable flat position adjacent said first air-flow means to an unstable curved position conforming to said curved wall adjacent said second air-flow means and closing the same to substantially prevent airflow through said housing when the length of the tape loop establishes a negative pressure differential at said second air-flow means, a photoelectric couple including at least a portion of said member controlled in accordance with the length of the tape loop, and reel control servo means controlled by said photoelectric couple.

6. A magnetic tape unit as defined in claim 5 wherein, said buffer includes at least one opaque wall and at least one transparent wall, and said second air-flow means is connected to the opaque wall of said buffer.

7. A magnetic tape unit as defined in claim 6 wherein, said buffer is connected to a vacuum source to thereby maintain an extended tape loop by virtue of vacuum force, and said housing is opaque said first cavity wall is a generally flat wall and said second cavity wall is a generally curved wall, said movable member is a thin flexible member having a stable flat condition when adjacent said first air-flow means, and being forced to assume an unstable curved position by vacuum pressure at said second air-flow means, in accordance with the length of the tape loop.

8. A magnetic tape unit as defined in claim 5 wherein, at least a portion of the surface of said movable member which faces said curved wall is a reflective surface, said photoelectric couple includes light source means and photocell means mounted in noncommunicating relation at said curved wall, and said movable member when in said unstable position effects communication between said light source means and said photocell means by virtue of said reflective surface.

9. A magnetic tape unit as defined in claim 8 wherein, the portion of said curved cavity wall which supports said movable member at said unstable position includes a recessed surface such that said movable member is supported without physical contact to that portion of said reflective surface which is relied upon to effect said communication between said light source means and said photocell means.

* * * * *

PO-1050
(5/69)

UNITED STATES PATENT OFFICE
CERTIFICATE OF CORRECTION

Patent No. 3,796,393      Dated March 12, 1974

Inventor(s)  Rex G. Beistle

It is certified that error appears in the above-identified patent and that said Letters Patent are hereby corrected as shown below:

Column 8, lines 8 through 15, please delete the following paragraphs:

"said first cavity wall is a generally flat wall and said second cavity wall is a generally curved wall, said movable member is a thin flexible member having a stable flat condition when adjacent said first air-flow means, and being forced to assume an unstable curved position by vacuum pressure at said second air-flow means, in accordance with the length of the tape loop".

Signed and sealed this 17th day of September 1974.

(SEAL)
Attest:

McCOY M. GIBSON JR.            C. MARSHALL DANN
Attesting Officer              Commissioner of Patents